3,522,093
PROCESSES OF CLEANING AND PASSIVATING
REACTOR EQUIPMENT
Wilfrid A. Woolman, Lake Charles, La., assignor to Chemical Cleaning and Equipment Service, Inc., Houston, Tex., a corporation of Texas
No Drawing. Filed Feb. 27, 1967, Ser. No. 619,525
Int. Cl. B08b 9/00, 9/02
U.S. Cl. 134—22                                      8 Claims

ABSTRACT OF THE DISCLOSURE

A method of removing deposits and passivating the tube-side surfaces of tube and shell type reactor equipment. The method comprises the circulation of various solutions; including inhibited acid, alkaline, and passivating solutions, through the tube-side of the reactor, with flushing steps occurring between the various chemical circulation steps. The flushing media is preferably nitrogen gas. The cleaning method may be followed by a step of circulating a heating medium on the shell side to prevent condensation of water in the air prior to start-up of the system.

---

This invention relates to new and useful improvements in methods of cleaning and passivating reactor equipment in refineries and petro-chemical plants. More particularly, this invention relates to new and useful improvements in methods of cleaning and passivating tube and shell reactors.

In the past, refinery and petro-chemical plants have been faced with problems of start up of equipment containing mill scale, iron oxide and other unwanted deposits. In addition, during operation of this equipment, a gradual buildup of unwanted deposits occurs which is capable of disrupting normal reactor equipment function.

Of equal importance in this invention is the chemical treatment and techniques used to produce passivated surfaces on metal to prevent re-deposition of oxide scales. This reactor equipment employs costly catalyst to achieve the desired organic synthesis of the final product. Mill scale, iron oxide and other unwanted deposits create conditions in the synthesis operation that produce off-specification product or consume valuable catalyst. It is an important feature of this invention to produce clean metal surfaces with passivation treatment which resists further deposition of unwanted scale accumulations until the equipment is fully operational.

To illustrate the importance of control of re-oxidation of reactor equipment metal surfaces, silver and other costly chemicals are used as catalysts in the synthesis of ethylene oxide. In some cases, the costly catalyst has had to be replaced twice in the ethylene oxide reactor equipment due to accumulations of unwanted scale deposits that occurred between cleaning and final start up of the reactor equipment.

It is, therefore, an object of this invention to provide new and improved methods for chemically cleaning reactor equipment metal surfaces and application of chemical passivation that resists re-deposition of unwanted scale deposits on the metal surfaces.

The preferred embodiment of this invention will be described hereinafter, together with the features thereof, and additional objects will become evident from such description.

The invention will be more readily understood from a reading of the following specification, wherein examples of the invention are described.

Briefly, the methods of this invention relate to the cleaning and passivation of metal surfaces of organic synthesis reactor equipment so as to remove scale deposits and other unwanted deposits from these surfaces and provide a passivated effect on the metal surfaces which resists re-oxidation of the metal. It has been found that various types of chemical treatment of cleaned metal surfaces produces a passivated surface that does not re-oxidize. This passivated surface allows immediate use of the reactor equipment with excellent product yield and no loss of costly catalyst.

Besides mill scale and iron oxide deposits, oil deposits and normal dirt soil deposits interfere with proper reactor equipment performance. The methods described in this invention provide for removal of these deposits as well as the mill scale and iron oxide deposits.

Typical of equipment other than reactors themselves that must be cleaned and rendered free of re-oxidation are gas-to-gas exchangers. This equipment is used to preheat reactant products prior to the organic synthesis operation. The feed-stream of these reactant products must be as clean and free of re-deposition of oxide or other unwanted deposit as the reactor. If these unwanted deposits are present in the gas-to-gas exchangers, there is a resultant lessening in product yield and loss of costly catalyst.

Another feature that must be present in the equipment prior to addition of catalyst is complete absence of chloride ion. This ion rapidly reacts with costly catalyst, destroying the catalyst. This does not rule out the use of chlorine bearing acid cleaning products, but rather demands that extra precautions be used in subsequent cleaning phases to remove all residual chloride ion.

By way of example, the following is a typical cleaning operation as used in cleaning ethylene oxide reactor equipment in a petro-chemical plant:

Step #1—Circulation of inhibited hydrochloric acid cleaning solution to remove mill scale and iron oxide. Any suitable organic inhibitor which controls the attack of the acid on bare metal may be used. It is preferred that a filming amine organic be used to provide this inhibiting of the acid.

Step #2—Purge system free of liquid with nitrogen and maintain nitrogen blanket on system.

Step #3—Flush system with mild citric acid solution, ammoniated to a pH of 3.5 and containing a corrosion inhibitor and surfactant. Any suitable inhibitor as above described may be used. The surface active agents are preferably non-ionics or amphoterics.

Step #4—Again purge system free of liquid with nitrogen and maintain nitrogen blanket on system.

Step #5—Circulation of alkaline cleaner containing chelating agents to remove balance of fouling deposits.

Step #6—Passivate by treatment with mono-sodium phosphate, disodium phosphate-sodium nitrite passivation solution.

Step #7—Purge system free of liquid with nitrogen and maintain nitrogen blanket on system until ready for use.

Step #8—Circulate Mobil-Therm, Dow-Therm or other suitable heating medium on shell side of reactor at temperature 20° to 30° F. above the dewpoint of atmosphere prior to and during the charging of the reactor equipment with catalyst.

In place of inhibited hydrochloric acid, suitably inhibited sulfuric acid, phosphoric acid, sulfamic acid or sodium acid sulfate may be employed.

The alkaline cleaner containing a chelating ingredient may be caustic soda based, caustic potash based or any of a series of alkaline phosphate salts or combinations of these products. The chelating ingredient may be sodium gluconate or any of the sodium salts of ethylene diamine tetra acetic acid.

Another typical cleaning operation includes the following steps:

Step #1—Circulation of alkaline cleaning solution containing a sequestering or chelating agent.

3

Step #2—Flushing with water.

Step #3—Scale removal by circulation of inhibited hydrochloric, sulfuric, phosphoric, sulfamic or sodium acid sulfate cleaning solution.

Step #4—Purge system free of liquid with nitrogen and maintain nitrogen blanket on system.

Step #5—Chemical treatment of metal surfaces with balanced iron phosphate solution to deposit amorphous iron phosphate film.

Step #6—Purge system free of liquid with nitrogen and maintain nitrogen blanket until system is put to use.

Step #7—Circulate Mobil-Therm, Dow-Therm or other suitable heating medium on shell side of reactor at temperature 20° to 30° F. above the dewpoint of atmosphere being introduced with catalyst on the tube side.

Another typical cleaning operation is illustrated in the following cleaning steps:

Step #1—Circulate alkaline cleaning solution containing a chelating agent.

Step #2—Flush system thoroughly with water.

Step #3—Circulate inhibited ammonium citrate solution at pH 3.5 to remove mill scale and rust.

Step #4—Adjust pH of solution to 8.5 with ammonia, add fixed alkalinity as caustic soda or soda ash, add sodium nitrate oxidizing additive and aerate to yield citrate passivation.

Step #5—Purge system free of liquid with nitrogen and maintain nitrogen blanket on system until ready for use.

Step #6—Circulate Mobil-Therm, Dow-Therm or other suitable heating medium on shell side of reactor at temperature 20° to 30° F. above the dewpoint of atmosphere being introduced with catalyst on the tube side.

Another typical cleaning operation is illustrated in the following cleaning steps:

Step #1—Circulate acid cleaning solution containing a corrosion inhibitor and surface active agent.

Step #2—Purge system free of liquid with nitrogen and maintain nitrogen blanket on system.

Step #3—Flush system with ¾ oz./gallon solution of citric acid for period of two hours or until pH reaches 5.

Step #4—Purge system free of liquid with nitrogen and maintain nitrogen blanket on system.

Step #5—Circulate passivating solution consisting of ¼% by weight trisodium phosphate, ¼% by weight disodium phosphate and ½% by weight sodium nitrite.

Step #6—Purge system free of liquid with nitrogen and maintain nitrogen blanket on system.

Step #7—Dry by use of inert gas, determining degree of dryness by dew point analysis and complete absence of chloride ion by analytical determination.

A final typical cleaning operation is illustrated in the following cleaning steps:

Step #1—Circulate alkaline cleaning solution, containing a sequestering agent.

Step #2—Purge system free of liquid with nitrogen and maintain nitrogen blanket on system.

Step #3—Passivate by treatment with mono-sodium phosphate, disodium phosphate, sodium nitrite passivating solution.

Step #4—Purge system free of liquid with nitrogen and maintain nitrogen blanket on system.

The use of the cleaning processes of the present invention has resulted in the removal of all soils both films and deposits, rust and mill scale and has provided passivation to protect the cleaned surfaces of the equipment. The initial cleaning step as shown by the foregoing examples may be either acid or alkaline steps depending on whether the equipment is coated with oil or other deposits which are best removed by the alkaline cleaning step.

It is generally preferred that the heating step following the last purging step be conducted at a temperature sufficiently high, i.e., 20° to 30° F. above the atmospheric dew point, to assure that all surfaces are dry before the equipment is charged for re-use.

What is claimed is:

1. The method of removing unwanted deposits and passivating the tube-side surfaces of reactor equipment having a tube side and a shell side before start-up including the steps of circulating an inhibited hydrochloric acid cleaning solution to remove mill scale and iron oxide, purging the equipment free of liquid with nitrogen and maintaining a nitrogen blanket in the equipment, circulating a mild citric acid solution, ammoniated to a pH of 3.5 and containing a corrosion inhibitor and surfactant to flush the equipment, purging the equipment free of liquid with nitrogen and maintaining a nitrogen blanket in the equipment, circulating an alkaline cleaner containing chelating agents to remove fouling deposits, circulating a passivation solution containing monosodium phosphate, disodium phosphate, and sodium nitrite to passivate the cleaned surfaces, purging the equipment free of liquid with nitrogen and maintaining a nitrogen blanket on the equipment until ready for use, and circulating a suitable heating medium on the shell side of the reactor at a temperature 20° to 30° F. above the dew point of the ambient atmosphere prior to start-up.

2. The method of removing unwanted deposits and passivating the tube-side surfaces of reactor equipment having a tube side and a shell side before start-up including the steps of circulating an alkaline cleaning solution containing a sequestering agent to remove soil and deposits, flushing the equipment with water, circulating an inhibited solution selected from the group consisting of hydrochloric acid, sulfuric acid, phosphoric acid, sulfamic acid and sodium acid sulfate to remove scale and rust, purging the equipment free of liquid with nitrogen and maintaining a nitrogen blanket in the equipment, circulating a balanced iron phosphate solution to deposit amorphous iron phosphate film on the cleaned metal surfaces, purging the equipment free of liquid with nitrogen and maintaining a nitrogen blanket until the equipment is put to use, and circulating a suitable heating medium on the shell side of the reactor at a temperature 20° to 30° F. above the dew point of the ambient atmosphere.

3. The method of removing unwanted deposits and passivating the tube-side surfaces of reactor equipment having a tube side and a shell side before start-up including the steps of circulating an alkaline cleaning solution containing a chelating agent to remove deposits and soils, flushing the equipment thoroughly with water, circulating an inhibited ammonium citrate solution at a pH of 3.5 to remove mill scale and rust, adjusting the pH of the citrate solution to 8.5 with ammonia, adding a base selected from the group consisting of caustic soda and soda ash, adding sodium nitrite as an oxidizing additive and aerating the solution to obtain citrate passivation of the system, purging the equipment free of liquid with nitrogen and maintaining a nitrogen blanket in the equipment until ready for use, and circulating a suitable heating medium on shell side of the reactor at a temperature 20° to 30° F. above the dew point of the ambient atmosphere.

4. The method of removing unwanted deposits and passivating the surfaces of reactor equipment before start-up including the steps of circulating an acid cleaning solution containing a corrosion inhibitor and surface active agent to remove rust and scale, purging the equipment system free of liquid with nitrogen and maintaining a nitrogen blanket in the equipment, flushing the equipment with a ¾ oz./gallon solution of citric acid in water for a period until the solution pH reaches 5.

purging the equipment free of liquid with nitrogen and maintaining a nitrogen blanket in the equipment, circulating a passivating water solution consisting of ¼ percent by weight trisodium phosphate, ¼ percent by weight disodium phosphate and ½ percent by weight sodium nitrite, purging the equipment free of liquid with nitrogen and maintaining a nitrogen blanket in the equipment, circulating an inert gas to dry the equipment, detecting dew point and chloride ions in said inert gas as a measure of the dryness of the equipment and continuing said inert gas circulation step until said detection step indicates a dry system.

5. The method of removing unwanted deposits and passivating the surfaces of reactor equipment before start-up including the steps of circulating an alkaline cleaning solution containing a sequestering agent to remove soils, purging the equipment free of liquid with nitrogen and maintaining a nitrogen blanket in the equipment, circulating a solution containing monosodium phosphate, disodium phosphate and sodium nitrite to passivate the cleaned surfaces, and purging the equipment free of liquid with nitrogen and maintaining a nitrogen blanket in the equipment.

6. The method of removing unwanted deposits and passivating the surfaces of reactor equipment before start-up including the steps of circulating an acid cleaning solution containing a corrosion inhibitor and surface active agent through the equipment to remove rust and scale therefrom, rinsing the equipment with demineralized water, circulating a citric acid cleaning solution, neutralizing the acid solution with ammonia to maintain a pH of 8.5 and adding sodium nitrite to such solution to passivate the cleaned surfaces, rinsing the equipment to neutral pH with demineralized, de-oxygenated water, draining liquid from the equipment under a nitrogen blanket, and drying the reactor equipment by circulating heated nitrogen.

7. The method according to claim 6, wherein said reactor equipment is maintained under a nitrogen blanket whenever air is admitted therein after cleaning.

8. The method according to claim 6, including maintaining the temperature of the reactor equipment 20° F. above the dew point of the ambient atmosphere whenever air is admitted therein after cleaning.

References Cited

UNITED STATES PATENTS

| | | | |
|---|---|---|---|
| 1,872,091 | 8/1932 | Mougey. | |
| 2,326,837 | 8/1943 | Coleman | 134—27 |
| 2,428,364 | 10/1947 | Frager | 134—2 |
| 3,003,896 | 10/1961 | Kendall | 134—3 |
| 3,066,050 | 11/1962 | Garton | 134—2 |
| 3,072,502 | 1/1963 | Alfano | 134—27 XR |
| 3,132,975 | 5/1964 | Freud | 134—26 XR |
| 3,166,444 | 1/1965 | Ehren et al. | 134—3 |
| 3,290,174 | 12/1966 | Kendall | 134—28 XR |
| 3,385,735 | 5/1968 | Brabrand et al. | 134—28 |
| 3,460,989 | 8/1969 | Rusch | 134—2 XR |

MORRIS O. WOLK, Primary Examiner

B. S. RICHMAN, Assistant Examiner

U.S. Cl. X.R.

134—2, 3, 21, 26, 27, 28, 29, 30, 41